US012478534B2

(12) United States Patent
Nail

(10) Patent No.: US 12,478,534 B2

(45) Date of Patent: Nov. 25, 2025

(54) LOCKING MECHANISM FOR REMOVABLY ATTACHING ACCESSORIES TO A MEDICAL PROCEDURE TABLE

(71) Applicant: Surgix Medical LLC, Spring, TX (US)

(72) Inventor: John Patrick Nail, Bentonville, AR (US)

(73) Assignee: Surgix Medical LLC, Spring, TX (US)

( * ) Notice: Subject to any disclaimer, the term of this patent is extended or adjusted under 35 U.S.C. 154(b) by 96 days.

(21) Appl. No.: 18/432,442

(22) Filed: Feb. 5, 2024

(65) Prior Publication Data

US 2024/0261167 A1 Aug. 8, 2024

Related U.S. Application Data

(60) Provisional application No. 63/444,049, filed on Feb. 8, 2023.

(51) Int. Cl.

| | |
|---|---|
| ***A61G 9/00*** | (2006.01) |
| ***A61G 13/10*** | (2006.01) |
| ***A61G 13/12*** | (2006.01) |

(52) U.S. Cl.

CPC ....... *A61G 13/101* (2013.01); *A61G 13/1285* (2013.01)

(58) Field of Classification Search

CPC .. A61G 13/00; A61G 13/101; A61G 13/1285; A61G 13/10

See application file for complete search history.

(56) References Cited

U.S. PATENT DOCUMENTS

| | | | | |
|---|---|---|---|---|
| 4,854,016 | A * | 8/1989 | Rice | A61G 13/101 24/514 |
| 4,901,964 | A | 2/1990 | McConnell | |
| 6,428,497 | B1 | 8/2002 | Crouch | |
| 8,256,050 | B2 | 9/2012 | Wong et al. | |
| 8,413,660 | B2 * | 4/2013 | Weinstein | A61G 13/0054 128/845 |
| 9,545,351 | B2 | 1/2017 | Sommer et al. | |
| 9,750,657 | B2 | 9/2017 | Drake | |
| 2006/0242765 | A1 * | 11/2006 | Skripps | A61G 13/04 5/624 |
| 2006/0255220 | A1 * | 11/2006 | Skripps | A61G 13/04 248/228.4 |
| 2017/0224569 | A1 * | 8/2017 | Pfeuffer | F16B 2/10 |

* cited by examiner

*Primary Examiner* — Fredrick C Conley

(74) *Attorney, Agent, or Firm* — Thomas S. Birney; Cochran Freund & Young LLC

(57) ABSTRACT

A medical procedure table has parallel spars supported by the base of the table. A number of accessories, such as table top segments, retractors, support pads, etc. can be removably attached at desired locations along the spars. Each accessory has a base with at least one downwardly-extending lip defining a channel for removably seating the accessory over at least one spar. A locking mechanism extends from the base of the accessory adjacent to the channel to automatically grip the spar between the locking mechanism and the lip as the accessory is seated over the spar. The locking grip mechanism can be manually released to reposition or remove the accessory.

10 Claims, 9 Drawing Sheets

LOCKING MECHANISM FOR REMOVABLY ATTACHING ACCESSORIES TO A MEDICAL PROCEDURE TABLE

RELATED APPLICATION

The present application is based on and claims priority to the Applicant's U.S. Provisional Patent Application 63/444,049, entitled "Locking Mechanism for Removably Attaching Accessories to a Medical Procedure Table," filed on Feb. 8, 2023.

BACKGROUND OF THE INVENTION

Field of the Invention

The present invention relates generally to the field of medical procedure tables. More specifically, the present invention discloses a locking mechanism for removably attaching accessories to a medical procedure table.

Background of the Invention

A wide variety of medical procedure tables have been used for many years to support patients undergoing medical procedures, such as surgery. Depending on the type of procedure, the table may be required to support the patient in any of a variety of positions. In addition, the table can be used to support a variety of accessories, such as pads, retractors, arm boards, extensions, table top segments, etc., depending on the medical procedure.

Many surgical tables are generally configured as shown for example in FIG. 1 and include a base 12 supporting a number of lift columns 14 at either end of the table 10. The height of each lift column 14 can be independently adjusted to control the elevation, inclination and tilt of the table top. A plurality of parallel table spars 16*a*, 16*b* extend between the ends of the table 10 and are supported by the upper ends of the lift columns 14. These spars 16*a*, 16*b* support the table top 20 and can also be used to removably attach support padding and surgical accessories to the table 10.

The current conventional approach to connect accessories to a table spar is to use a C-shaped clamp that compresses against the top and bottom of the spar. In some instances, a Velcro strap is wrapped around the spar to secure an accessory to the table. However, both of these prior-art approaches require 360 degree access to the spar in the region of attachment, which can interfere with use of the spars to support the table top. In addition, these approaches require time and effort by the medical staff, as well as a degree of care and dexterity to properly attach accessories to table spars.

In contrast, the present invention provides a locking mechanism for a medical procedure table that automatically secures accessories to the spars of the table as they are lowered into placed at their desired location on the spars. These accessories can also be quickly and easily removed when not required. Further, the present invention does not interfere with other uses of the spars or side rails.

SUMMARY OF THE INVENTION

This invention provides a medical procedure table having parallel spars supported by the base of the table. A number of accessories, such as table top segments, retractors, support pads, etc. can be removably attached at desired locations along the spars. Each accessory has a base with at least one downwardly-extending lip defining a channel for removably seating the accessory over at least one spar. A locking mechanism extends from the base of the accessory adjacent to the channel to automatically grip the spar between the locking mechanism and the lip as the accessory is seated over the spar. The locking grip mechanism can be manually released to reposition or remove the accessory.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
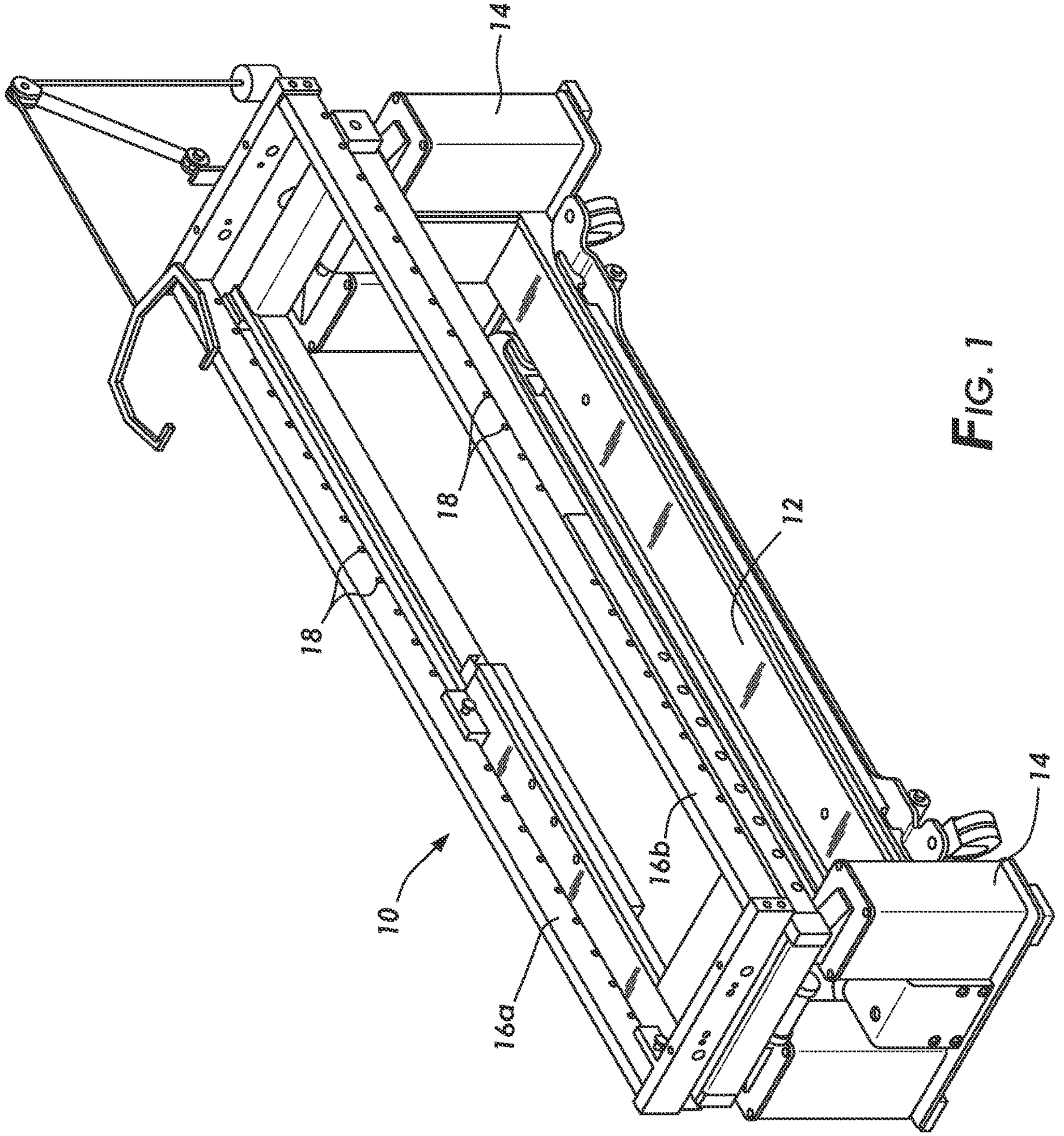
FIG. 1 is an axonometric view of a medical procedure table 10 with table spars 16*a*, 16*b*.

Turning to FIG. 1, an embodiment of the present medical procedure table 10 is shown that includes a base 12 supporting lift columns 14 at either end of the table 10. The height of each lift column 14 can be independently adjusted to control the elevation, inclination and tilt of the table top 20. At least two parallel table spars 16*a*, 16*b* extend between the ends of the table 10 and are supported by the upper ends of the lift columns 14. Preferably, these spars 16*a*, 16*b* are rails having a substantially rectangular cross-section with substantially vertical inner and outer lateral wall. A table top 20 can be secured to the spars 16*a*, 16*b* to provide to create a top surface for the table 10. Optionally, a number of smaller modular table top segments can be removably secured over the spars 16*a*, 16*b* to allow customization of the top surface.

The table 10 can also be customized by removably attaching any of a variety of accessories to the spars 16*a*, 16*b* as shown in FIGS. 2-5. The term "accessories" should be broadly construed for the purposes of this application to include any type of medical accessory or attachment that can be used in association with a medical procedure table. Examples of such accessories include pads (e.g., FIGS. 2-4), retractors, arm boards, limb extensions and table top segments (e.g., FIG. 5). In addition, the number, arrangement, type and positions of these accessories can be readily customized to the meet the requirements of each specific patient and medical procedure.

Figure 4:
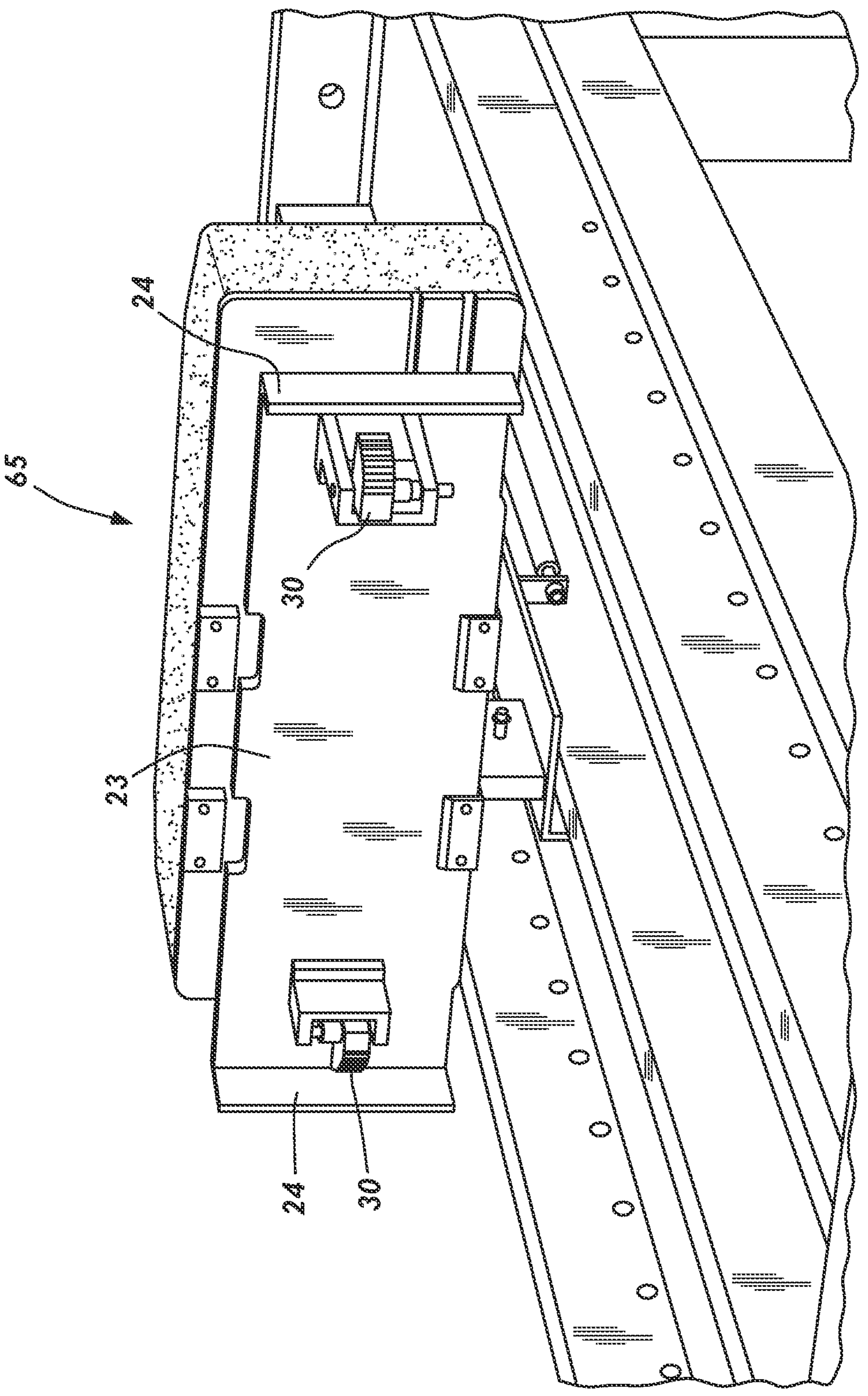
FIG. 4 is a photo corresponding to FIG. 3 showing the bottom of the chest pad assembly 65 and its locking mechanisms.
Figure 5:
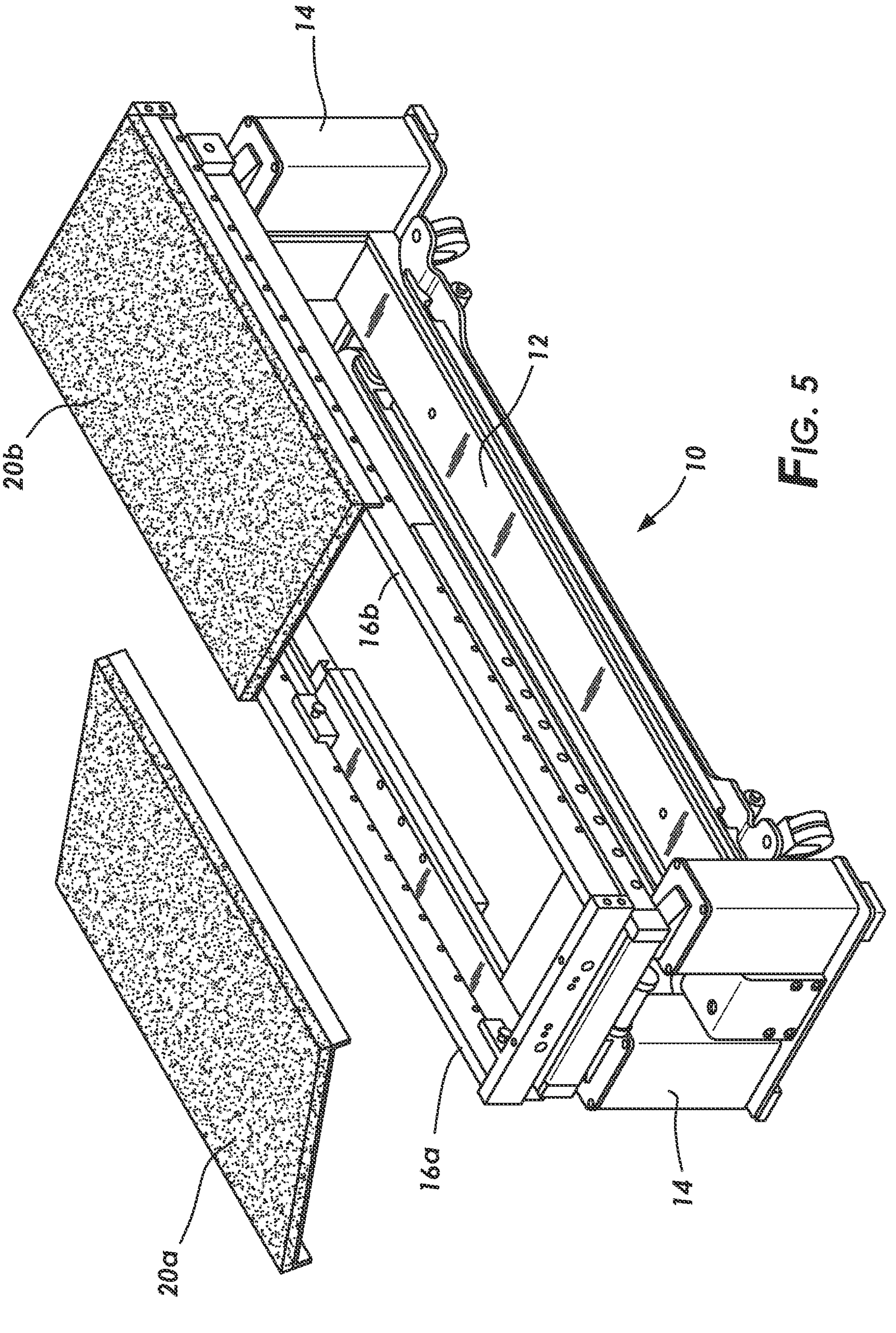
FIG. 5 is a photo showing a table top 20 being lowered onto a table 10 as an accessory.

As illustrated for example in FIG. 4, each accessory generally has a bottom surface or base 23 that seats over at least one of the spars 16*a*, 16*b*. A smaller accessory may only seat over one spar, while a larger or wider accessory may seat over both spars. Each accessory also has at least one lateral lip 24 that extending downward from the base of the accessory to define one or more channels to receive at least one spar 16*a*, 16*b*. Preferably, the lateral lip 24 wraps over an edge of the spar. If the accessory seats over both spars 16*a*, 16*b*, it can be equipped with opposing outer lateral lips 24 that wrap over the outer edges of both spars. For example, the embodiments of the accessories shown in FIGS. 2-5 have outer lateral lips 24 that are parallel to, and spaced apart from one another to wrap around the outside edges of both table spars 16*a*, 16*b*. These lateral lips 24 constrain lateral movement of the accessory on the spars 16*a*, 16*b*, but allow the accessory to be readily attached at any desired location along the length of the spars 16*a*, 16*b*. This configuration also has the advantage of allowing the accessories to be mounted to the spars 16*a*, 16*b* of the table without interfering with the location or functionality of the side rails.

Alternatively, sets of opposing downwardly-extending lips can be used to seat the accessory on the spars 16*a*, 16*b*. These sets of opposing lips can be used to contact either the outside or inside lateral surfaces of the table spars 16*a*, 16*b* and thereby constrain lateral movement of the accessory on the spars 16*a*, 16*b*.

In yet another alternative embodiment, a set of parallel channels can be formed in the bottom of the accessory to seat over the spars 16*a*, 16*b*. Here again, the opposing sets of lateral walls of these channels serve as "lips" to constrain lateral movement of the accessory on the spars 16*a*, 16*b*, but allow it to be readily attached at any desired location along the length of the spars 16*a*, 16*b*. These channels should be viewed as functional equivalents of the downwardly-extending lips described above.

Each accessory also has at least one built-in locking mechanism 30 on the bottom of the accessory to secure it to the spars 16*a*, 16*b* of the table 10. Preferably, each accessory is equipped with at least one rubberized locking grip 30 that grasps a table spar 16 to removably secure the accessory in its desired position with respect to the spar 16 and table 10. Preferably, each accessory has at least one (and possibly more) locking grip 30 for each spar that the accessory seats over.

Figure 6:
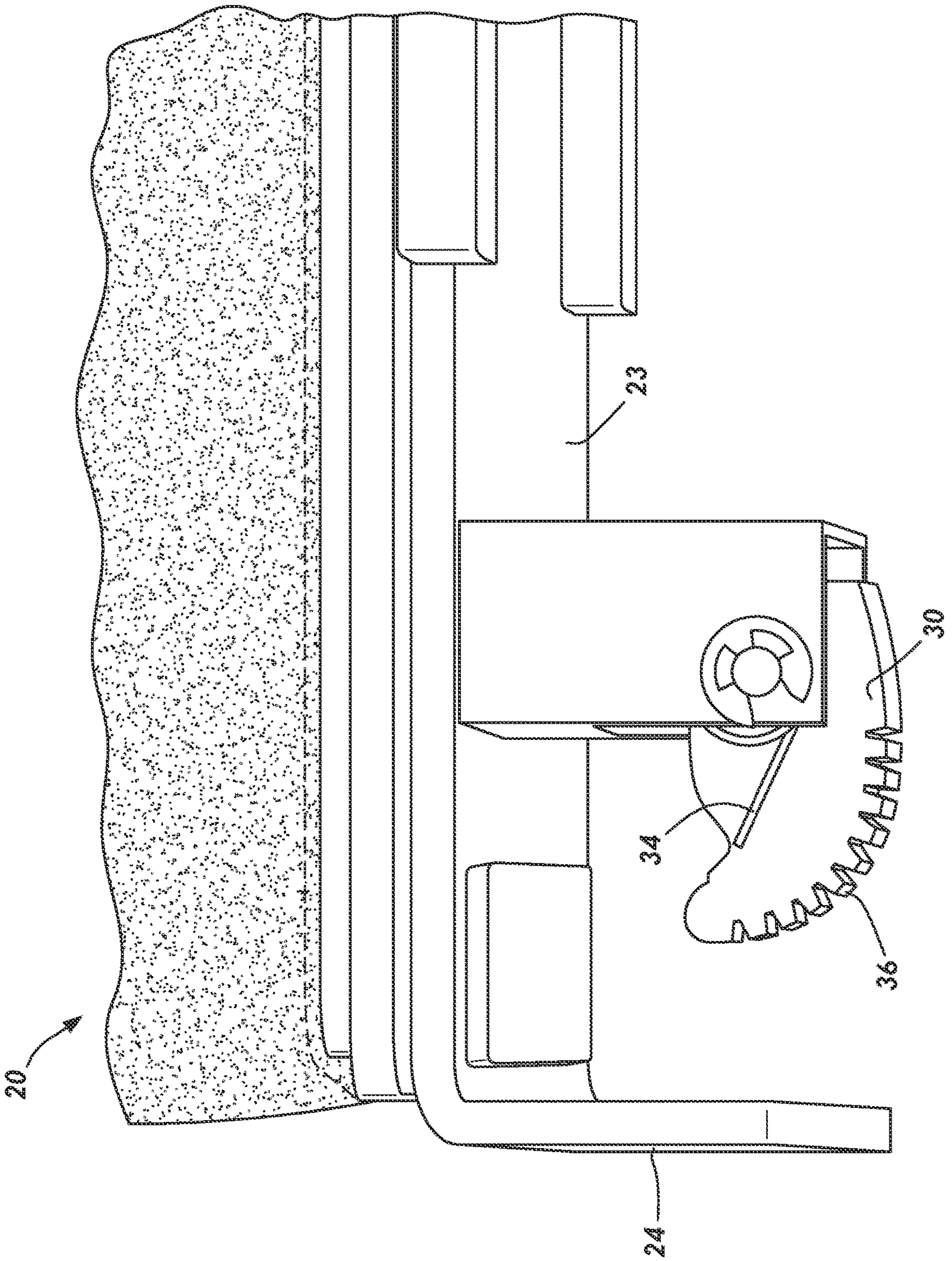
FIG. 6 is a photo of the locking mechanism and outer lip 24 of the accessory.

One embodiment of the locking mechanism is illustrated in FIG. 6. The locking mechanism includes a cam-shaped locking grip 30 that is mounted to the bottom 23 of the accessory at a predetermined separation across the channel from the lateral lip 24 so that it can pivot to a degree about its center of rotation 32 between a released position and a locked position. In the released position, the locking mechanism is prepared to receive and engage a spar 16 in the channel between the locking grip 30 and lip 24.

Figure 9:
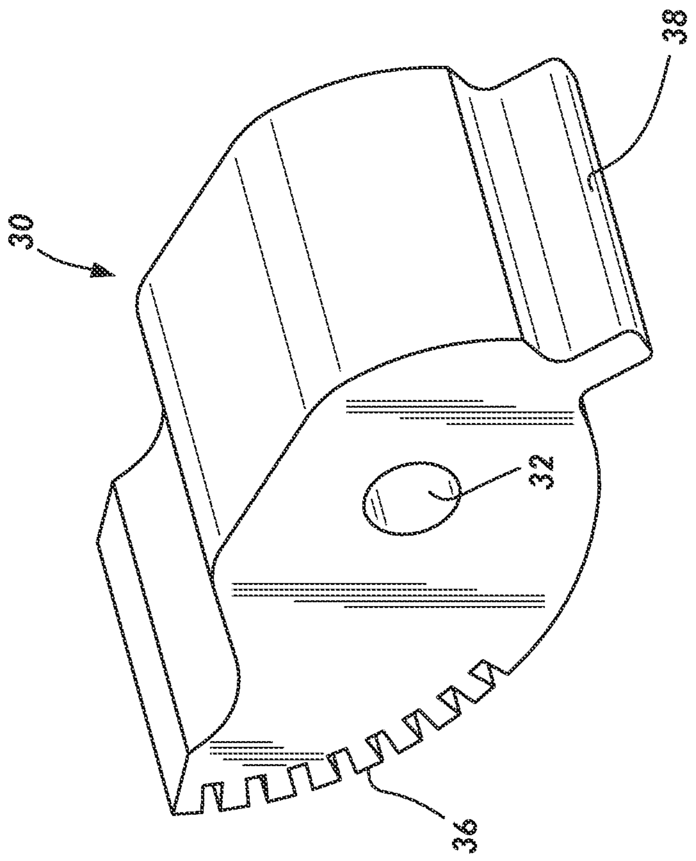
FIG. 9 is an axonometric view of the cam-shaped locking grip 30 of the locking mechanism.

As shown in FIG. 9, at least a portion of the outer perimeter of the locking grip 30 is curved or spirals radially outward from the center of rotation 32 (similar to the cross-sectional shape of a nautilus) to define a contact surface 36 facing the adjacent lip 24 that is compressed against the adjacent (inside) side of the spar 16 as the accessory is seated over the spar 16 and the locking grip 30 rotates to its locked position. This contact surface 36 can be equipped with a series of rubber or elastomeric teeth that increase friction and are compressed against the spar 16.

Figure 7:
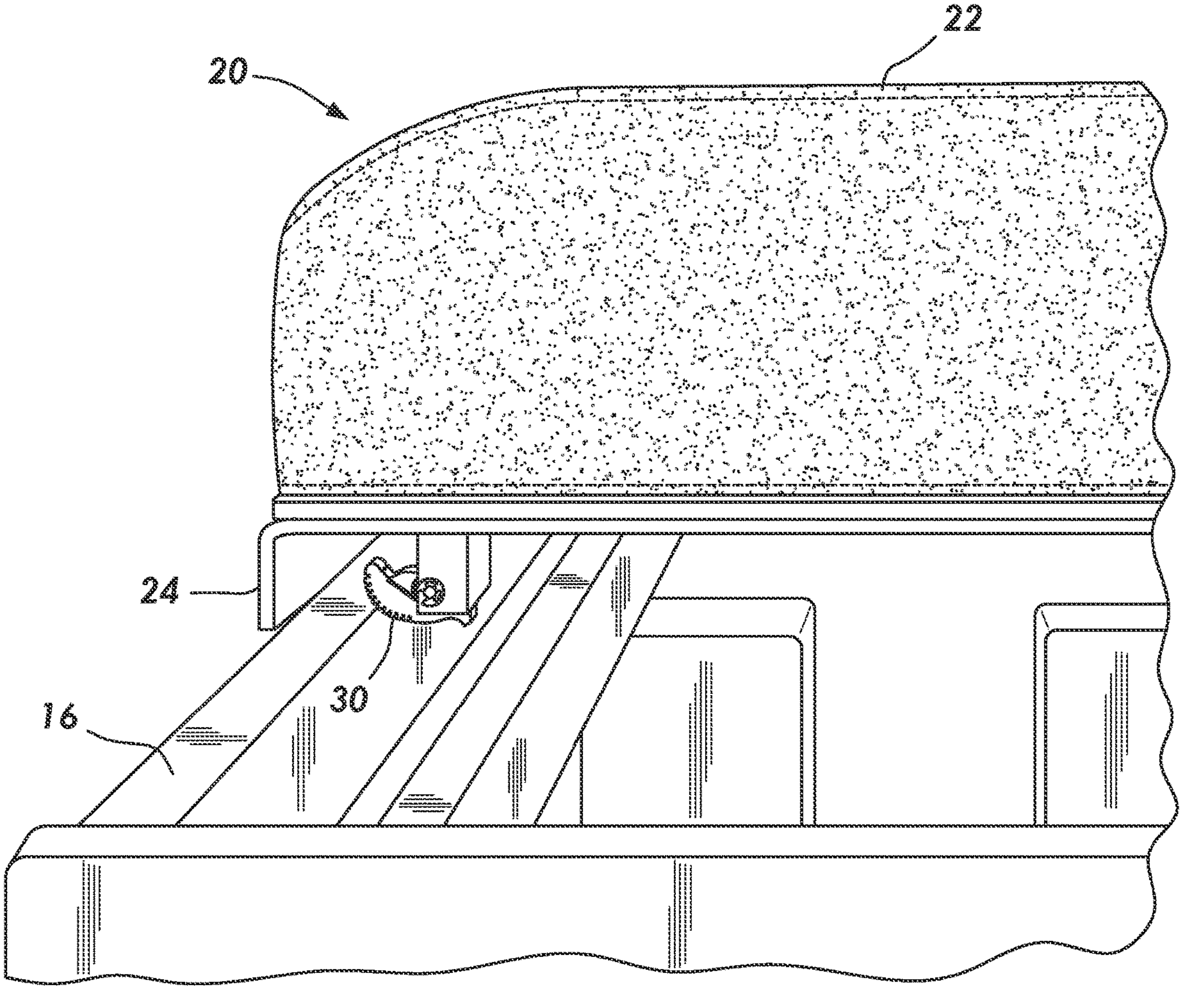
FIG. 7 is a photo showing the locking mechanism of an accessory being lowered onto a spar 16.
Figure 8:
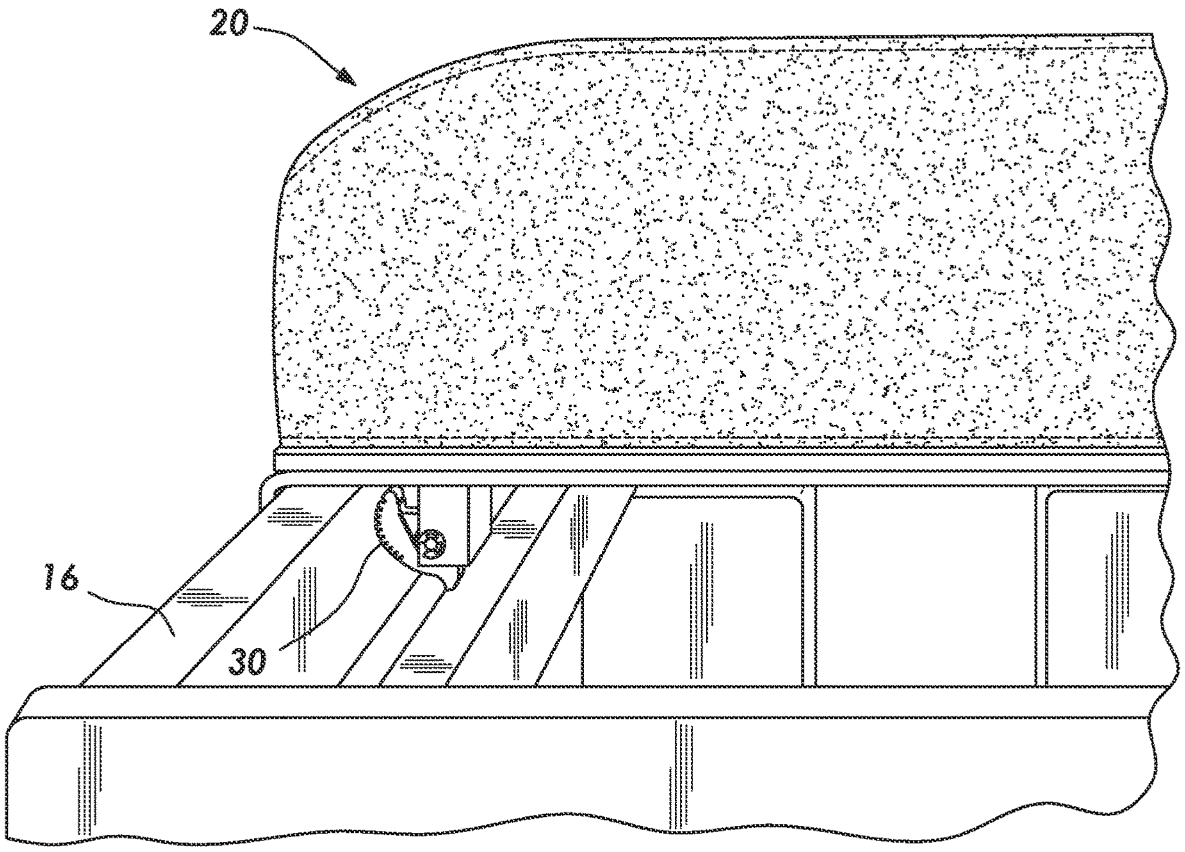
FIG. 8 is a photo showing the locking mechanism engaging a spar 16.

As shown in FIG. 7, a spring 34 biases the rotational position of the locking grip 30 so that the tip of its contact surface 36 protrudes into the channel for the spar 16 (i.e., the space toward the adjacent outer lip 24), and then comes into initial contact with the spar 16 as the accessory is seated over the spar. After this initial contact, further lowering of the accessory onto the spar 16 causes the locking grip 30 to rotate about its center of rotation 32, and also causes the teeth on the contact surface 36 of the locking grip 30 to progressively compress against the side of the spar 16, as shown in FIG. 8. In this locked position, the spar is effectively gripped between the contact surface 36 of the locking grip 30 and the adjacent outer lateral lip 24 by the compressive force exerted by the locking grip 30. It should be noted this locking action occurs automatically as the accessory is lowered onto the spar. The spring 34 also biases the locking grip 30 to remain in its released position to receive a spar 16.

Figure 2:
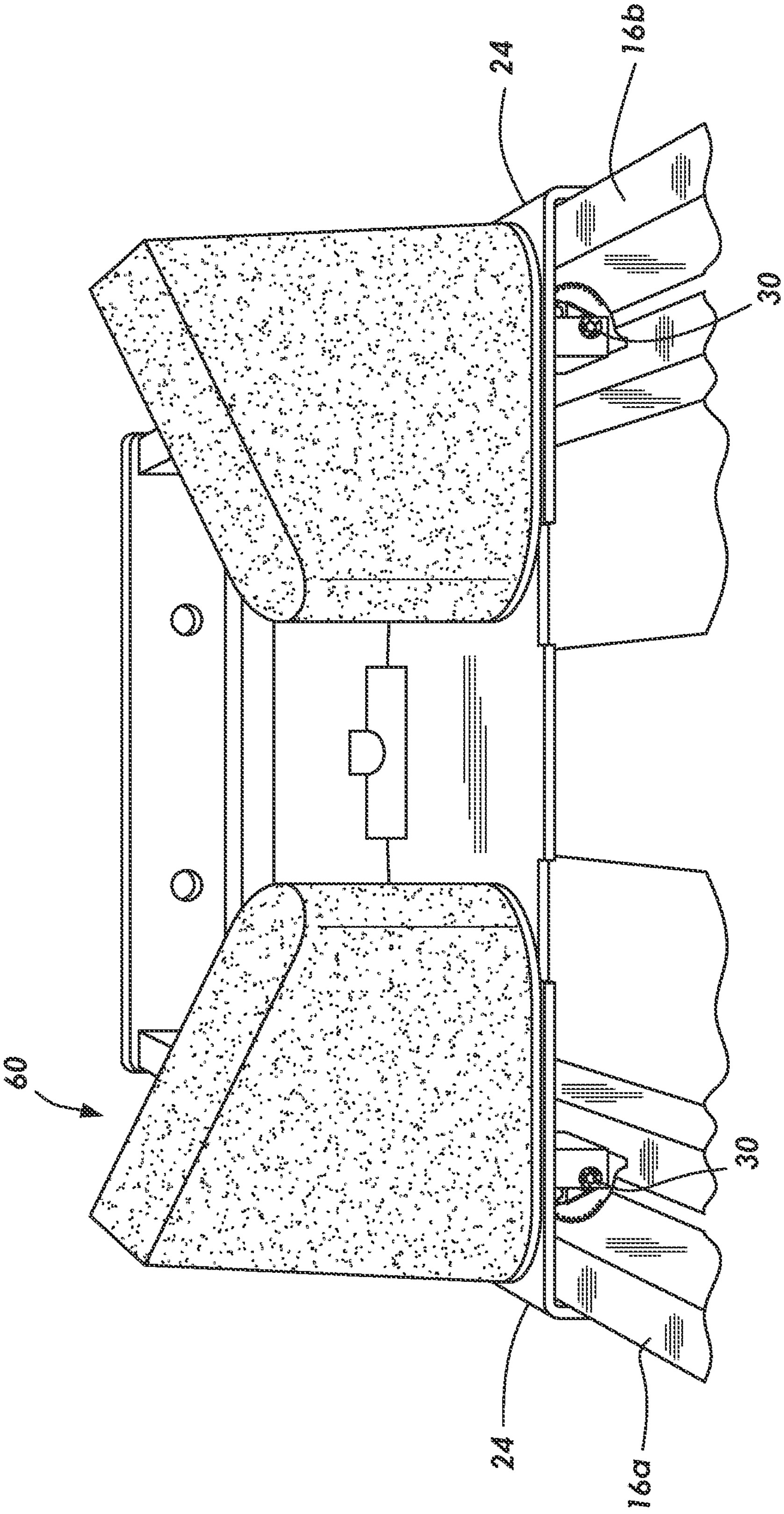
FIG. 2 is a photo of a pelvic pad assembly 60 as an accessory.
Figure 3:
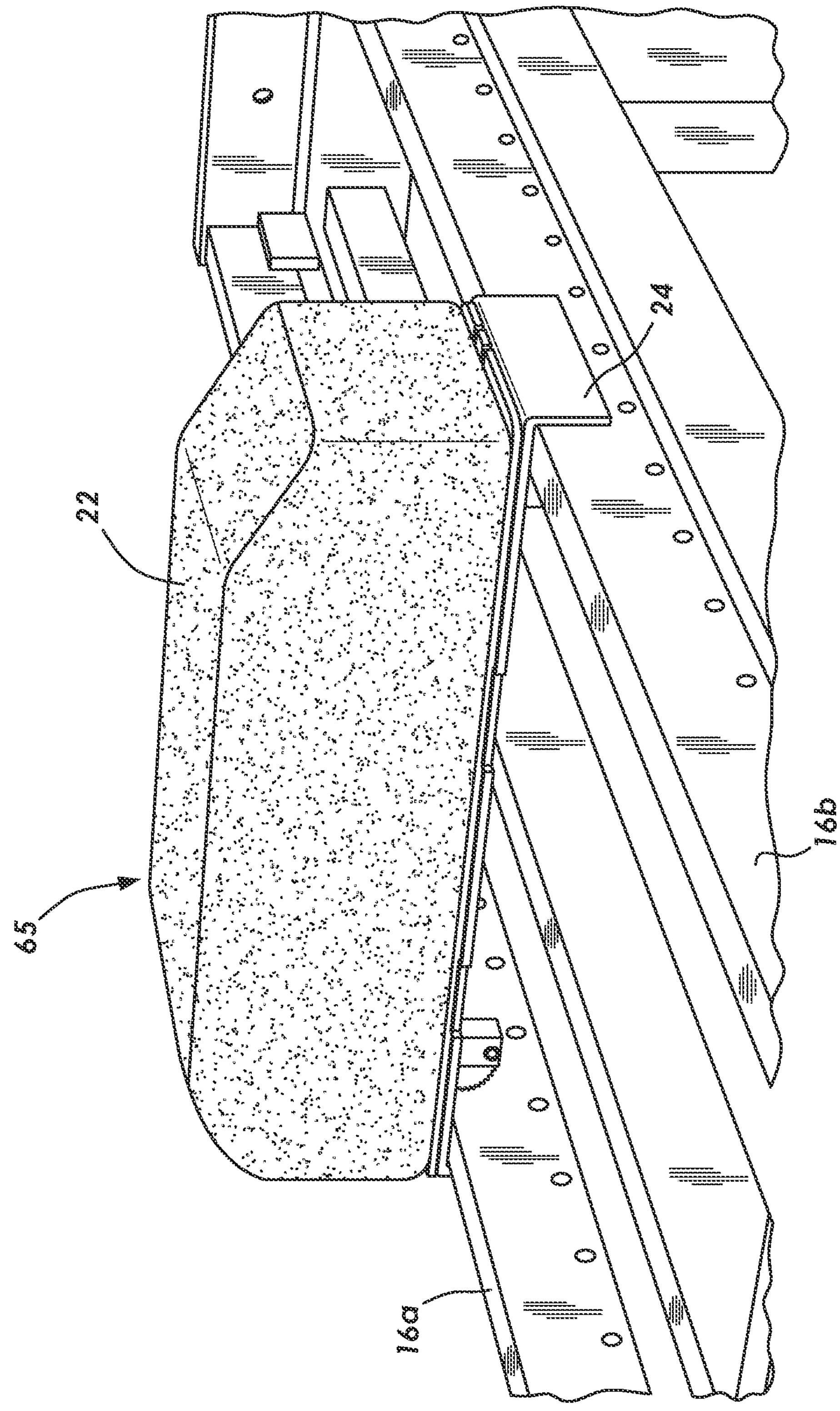
FIG. 3 is a photo of a chest pad assembly 65 as an accessory.

It should be noted that multiple sets of locking mechanisms can be used to simultaneously removably secure an accessory to both spars 16*a*, 16*b*. For example, FIG. 2 shows a pelvic pad assembly 60 having two adjustable pads with a platen or base that seat over two spars 16*a*, 16*b*. The locking mechanisms can also be arranged in opposing sets, so that some of the locking grips exert a compressive force against the inside lateral surfaces of one of more spars 16*a*, 16*b*, while other locking grips exert a compressive force against the outside lateral surface of one or more spars. This arrangement results in the locking mechanisms securely gripping both sides of the spar(s) to securely hold the accessory in place on the spar(s).

The locking mechanism is also provided with a release handle 38 extending radially outward from the locking grip 30. The user can manually rotate the locking grip 30 by means of this release handle 38 from the locked position to its released position to release the accessory and allow it to be removed or repositioned. Thus, the locking grips 30 allow accessories to be firmly secured to the table spars 16*a*, 16*b* while also allowing for easy removal of the accessories when not required. Alternatively, other types of locking mechanisms could be employed to provide a releasable friction fit between the accessories and spars 16*a*, 16*b*.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A medical procedure table comprising:

a base;

a plurality of parallel spars supported above the base, each spar having inner and outer lateral walls; and an accessory removably attachable to at least one spar, said accessory having:

(a) a bottom with at least one channel for receiving at least one spar as the accessory is seated over the spar; and (b) a locking mechanism adjacent to a channel to removably secure the accessory at a desired position along a spar, said locking mechanism having a cam-shaped locking grip automatically rotating between: (i) a released position in which the accessory can be detached from the spar; and (ii) a locked position in which the locking grip is compressed against a spar to thereby secure the accessory to the spar as the accessory is seated over the spar.

2. The medical procedure table of claim 1 wherein the channel comprises a lip extending downward from the accessory, and the locking mechanism is located adjacent to the channel opposite the lip, whereby the spar is gripped between the lip and the locking mechanism.

3. The medical procedure table of claim 1 wherein the locking member further comprises a spring biasing the rotational position of the locking grip to remain in the released position when the accessory is not seated over the spars.

4. The medical procedure table of claim 1 wherein the locking grip is cam-shaped.

5. The medical procedure table of claim 1 wherein the locking grip is made of a compressible material.

6. The medical procedure table of claim 1 wherein the locking grip further comprises a contact surface curving radially outward from a center of rotation with a tip extending into a channel in the released position, and wherein said tip comes into contact with a spar and automatically rotates the locking grip to the locked position with the contact surface compressed against the spar as the accessory is seated over the spars.

7. A medical procedure table comprising:
- a base;
- a plurality of parallel spars supported above the base, each spar having inner and outer lateral walls; and
- an accessory removably attachable to at least one of the spars, said accessory having:
  - (a) a lip extending downward from the accessory to define a channel for receiving a spar; and
  - (b) a locking mechanism adjacent to the channel and opposite the lip, said locking mechanism having a cam-shaped locking grip automatically rotating between: (i) a released position in which the accessory can be detached from the spar; and (ii) a locked position in which the locking grip is compressed against the spar to grip the spar between the locking grip and the lip as the accessory is seated over the spar.

8. The medical procedure table of claim 7 wherein the locking member further comprises a spring biasing the rotational position of the locking grip to remain in the released position when the accessory is not seated over the spar.

9. The medical procedure table of claim 7 wherein the locking grip is made of a compressible material.

10. The medical procedure table of claim 7 wherein the locking grip further comprises a contact surface curving radially outward from a center of rotation with a tip extending into a channel in the released position, and wherein said tip comes into contact with the spar and automatically rotates the locking grip to the locked position with the contact surface compressed against the spar as the accessory is seated over the spar.

* * * * *